(12) United States Patent
Yamanaka et al.

(10) Patent No.: US 11,794,419 B2
(45) Date of Patent: Oct. 24, 2023

(54) FIBER-REINFORCED RESIN MOLDING MATERIAL MOLDED PRODUCT AND METHOD OF PRODUCING SAME

(71) Applicant: Toray Industries, Inc., Tokyo (JP)

(72) Inventors: Yusuke Yamanaka, Nagoya (JP); Takafumi Hashimoto, Nagoya (JP); Tetsuya Motohashi, Nagoya (JP); Yasukazu Ono, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 208 days.

(21) Appl. No.: 17/598,504

(22) PCT Filed: Mar. 9, 2020

(86) PCT No.: PCT/JP2020/010098
§ 371 (c)(1),
(2) Date: Sep. 27, 2021

(87) PCT Pub. No.: WO2020/195756
PCT Pub. Date: Oct. 1, 2020

(65) Prior Publication Data
US 2022/0176647 A1    Jun. 9, 2022

(30) Foreign Application Priority Data

Mar. 27, 2019   (JP) ................................. 2019-060666

(51) Int. Cl.
*B29C 70/12*   (2006.01)
*B29B 15/10*   (2006.01)
(Continued)

(52) U.S. Cl.
CPC ............ *B29C 70/12* (2013.01); *B29B 15/105* (2013.01); *B29C 70/42* (2013.01); *C08J 5/042* (2013.01);
(Continued)

(58) Field of Classification Search
None
See application file for complete search history.

(56) References Cited

U.S. PATENT DOCUMENTS

2010/0178495 A1    7/2010   Taketa et al.
2015/0203663 A1    7/2015   Sonoda et al.
(Continued)

FOREIGN PATENT DOCUMENTS

EP    3 315 275 A1    5/2018
EP    3 578 329 A1    12/2019
(Continued)

OTHER PUBLICATIONS

Extended European Search Report dated Nov. 22, 2022, of counterpart European Application No. 20779020.5.

*Primary Examiner* — Alexander S Thomas
(74) *Attorney, Agent, or Firm* — DLA Piper LLP (US)

(57) ABSTRACT

A fiber-reinforced resin molding material molded product includes a fiber-reinforced resin molding material prepared by impregnating chopped fiber bundles obtained by cutting a reinforcing fiber bundle with a matrix resin, wherein in a region excluding 30 mm from an edge of the molded product, when an arbitrary rectangular region having an area of 40 mm² or more and defined by a thickness of the molded product and a width in a direction perpendicular to a thickness direction of the molded product is set in a cross section in an arbitrary thickness direction of the molded product, with respect to a bundle thickness of the chopped fiber bundles present in the set rectangular region.

11 Claims, 7 Drawing Sheets

(51) Int. Cl.
*B29C 70/42* (2006.01)
*C08J 5/04* (2006.01)
*B29K 101/10* (2006.01)
*B29K 105/12* (2006.01)
*B29K 307/04* (2006.01)

(52) U.S. Cl.
CPC ...... *B29K 2101/10* (2013.01); *B29K 2105/12* (2013.01); *B29K 2307/04* (2013.01)

(56) References Cited

U.S. PATENT DOCUMENTS

| | | |
|---|---|---|
| 2019/0091944 A1 | 3/2019 | Motohashi et al. |
| 2019/0161890 A1 | 5/2019 | Motohashi et al. |

FOREIGN PATENT DOCUMENTS

| | | |
|---|---|---|
| JP | 5-4246 A | 1/1993 |
| JP | 2009-062474 A | 3/2009 |
| JP | 2013-202890 A | 10/2013 |
| JP | 5572947 B2 | 7/2014 |
| WO | 2009/150406 A2 | 12/2009 |
| WO | 2014/017612 A1 | 1/2014 |
| WO | 2017/159264 A1 | 9/2017 |
| WO | 2017/221655 A1 | 12/2017 |
| WO | 2018/143068 A1 | 8/2018 |

FIBER-REINFORCED RESIN MOLDING MATERIAL MOLDED PRODUCT AND METHOD OF PRODUCING SAME

TECHNICAL FIELD

This disclosure relates to a molded product of a fiber-reinforced resin molding material obtained by impregnating chopped fiber bundles, prepared by cutting fiber bundles of continuous reinforcing fibers and depositing them in a sheet form, with a matrix resin, and a method of producing the same.

BACKGROUND

A technology is known wherein a fiber-reinforced resin molding material comprising a sheet composed of chopped fiber bundles, obtained by distributing chopped fiber bundles of discontinuous reinforcing fibers prepared by cutting continuous reinforcing fibers, and a matrix resin, is used, and by molding applied with heating and pressurizing, a fiber-reinforced plastic having a complicated shape such as a three-dimensional shape is molded. As that molding technology, a technology using a sheet molding compound (SMC) or a stampable sheet is known.

A molded product using a fiber-reinforced resin molding material such as an SMC or a stampable sheet is obtained by molding, applied with heating and pressurizing, a sheet prepared by impregnating a sheet composed of chopped fiber bundles cut at a desired length with a matrix resin of a thermosetting resin or a thermoplastic resin, using a heating type press machine. In many instances, since before pressurization a sheet is cut smaller than a molded product and placed in a mold, and the sheet is flowed into the shape of the molded product by pressurization to perform molding, it becomes possible that it follows a complicated shape such as a three-dimensional shape.

In a molded product of a fiber-reinforced resin molding material comprising randomly distributed chopped fiber bundles as described above, the strength of the molded product of the fiber-reinforced resin molding material is determined by the fracture due to stress concentration at each fiber bundle end. On the other hand, in JP-A-2013-202890, WO 2014/017612 and JP-B-5572947, disclosed is a method of improving the strength of a molded product of a fiber-reinforced resin molding material by reducing the average bundle thickness of chopped fiber bundles. Further, in a molded product of a fiber-reinforced resin molding material comprising chopped fiber bundles, when there is a weak part, it will be destroyed from the weak part and the strength of the molded product will be determined by the strength of the weak part, and therefore, it is important to enhance the homogeneity of the molded product. For this, WO 2017/159264 discloses a method of reducing the CV value (coefficient of variation) of the layer thickness to improve the homogeneity.

JP '890, WO '612 and JP '947 disclose fiber-reinforced resin molding materials and reinforcing fiber sheets that define the average values of fiber length, fiber bundle thickness and fiber bundle width of reinforcing fibers. However, there is no description with respect to the bundle thickness distribution existing in the molded product of the fiber reinforced composite material, and there is room for improvement in the strength and homogeneity of the molded product by, for example, specifying the ratio of the thick bundles that become the weak parts of the molded product.

In WO '264, although a method of reducing the CV value of the layer thickness and improving the homogeneity is disclosed, the bundle thickness distribution of chopped fiber bundles in the molded product is not specified and, when thick bundles are distributed in the molded product, there is a possibility the strength may decrease, and therefore, there is still room for improvement.

Accordingly, in view of such background technologies, it could be helpful to provide a fiber-reinforced resin molding material molded product capable of indicating an excellent homogeneity and exhibiting excellent mechanical properties when being made into a molded product by appropriately controlling the distribution of the fiber bundle thickness contained in the molded product of the fiber-reinforced resin molding material, and a method of producing the same.

SUMMARY

We thus provide:

(1) A fiber-reinforced resin molding material molded product which is a molded product [D] comprising a fiber-reinforced resin molding material [C] prepared by impregnating chopped fiber bundles [A] obtained by cutting a reinforcing fiber bundle with a matrix resin [B], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, the following requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;

[2] a ratio of the chopped fiber bundles [A] having a bundle thickness [E] of 200 μm or more is 5% or less; and

[3] a CV value of the bundle thickness [E] is 10-60%.

(2) The fiber-reinforced resin molding material molded product according to (1), wherein the ratio of the chopped fiber bundles [A] having a bundle thickness [E] of 200 μm or more is 0.1-5%.

(3) The fiber-reinforced resin molding material molded product according to (1) or (2), wherein an average value of the bundle thickness [E] is 50 μm or more and 100 μm or less.

(4) The fiber-reinforced resin molding material molded product according to any one of (1) to (3), wherein the reinforcing fiber bundle is a carbon fiber bundle.

(5) The fiber-reinforced resin molding material molded product according to any one of (1) to (4), wherein the matrix resin [B] is a thermosetting resin selected from a vinyl ester resin, an epoxy resin or an unsaturated polyester resin.

(6) A method of producing a fiber-reinforced resin molding material molded product which is a molded product [D] comprising a fiber-reinforced resin molding material [C] prepared by impregnating chopped fiber bundles [A] obtained by cutting a reinforcing fiber bundle with a matrix resin [B], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, the following requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;

[2] a ratio of the chopped fiber bundles [A] having a bundle thickness [E] of 200 μm or more is 5% or less; and

[3] a CV value of the bundle thickness [E] is 10-60%.

(7) The method of producing a fiber-reinforced resin molding material molded product according to (6), wherein the ratio of the chopped fiber bundles [A] having a bundle thickness [E] of 200 μm or more is in a range of 0.1-5%.

(8) The method of producing a fiber-reinforced resin molding material molded product according to (6) or (7), wherein the chopped fiber bundles [A] are distributed by a distributor [G] after widening and cutting the reinforcing fiber bundle.

(9) The method of producing a fiber-reinforced resin molding material molded product according to (8), wherein the distributor [G] distributes the chopped fiber bundles by hitting them with rods, and the speed of the rods hitting the chopped fiber bundles is in a range of 0.1-8 m/sec.

(10) The method of producing a fiber-reinforced resin molding material molded product according to (8) or (9), wherein with respect to the widening of the reinforcing fiber bundle, the widening ratio is controlled at 300-1,200%.

(11) The method of producing a fiber-reinforced resin molding material molded product according to any one of (6) to (10) wherein the chopped fiber bundles [A] are distributed by a distributor [G] after widening the reinforcing fiber bundle and after cutting a partially separated fiber bundle [F] that has been subjected to partial separation processing for intermittently providing slits along a fiber orientation direction of the widened reinforcing fiber bundle.

It is possible to obtain a fiber-reinforced resin molding material molded product capable of exhibiting excellent homogeneity and mechanical properties.

EXPLANATION OF SYMBOLS

Figure 1:
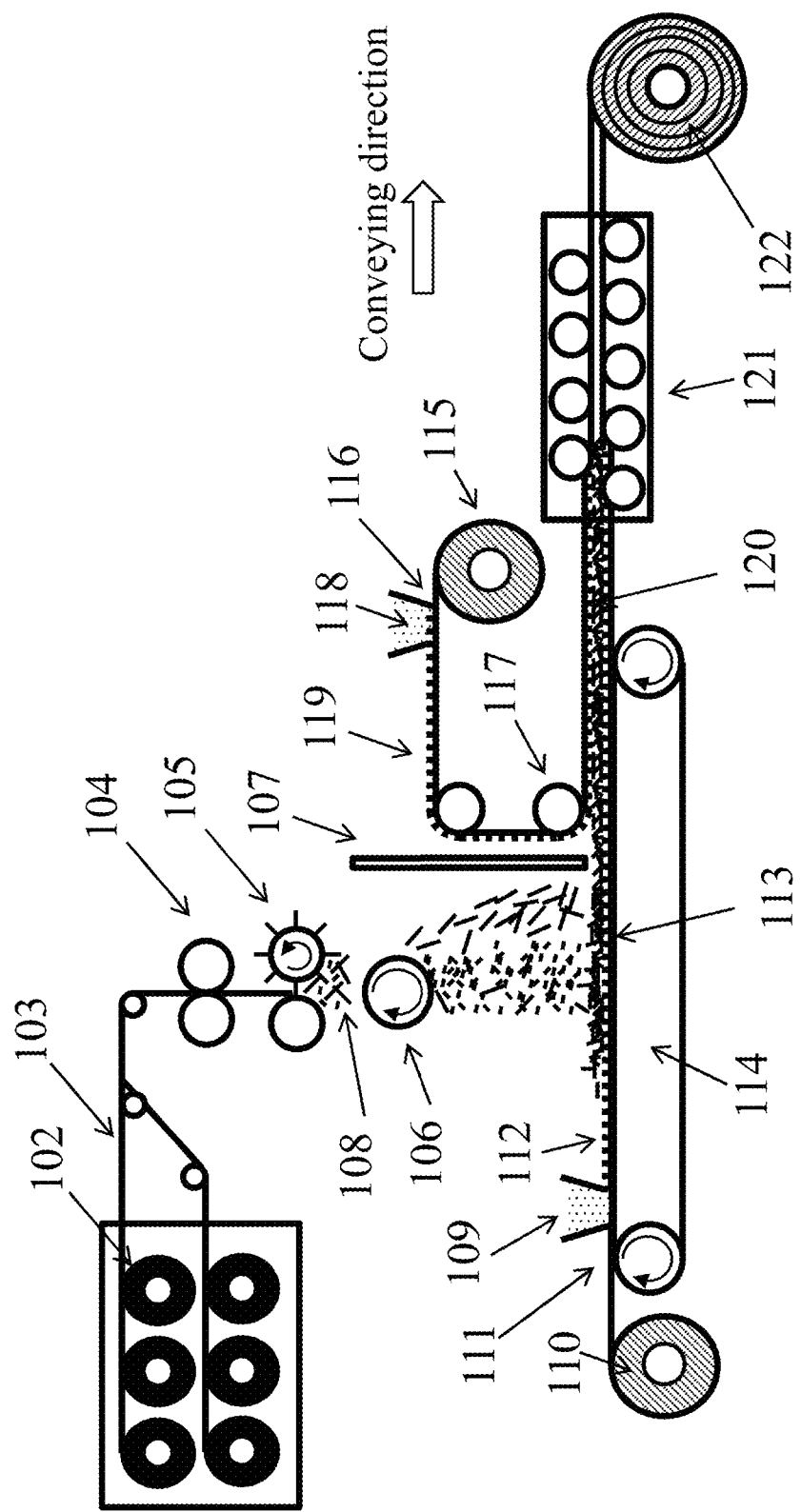
FIG. 1 is a schematic diagram showing an example of a process of producing a fiber-reinforced resin molding material.

102: bobbin wound with continuous reinforcing fiber bundle
103: continuous reinforcing fiber bundle
104: nip roll
105: cutting machine
106: distributor
107: scattering regulation plate
108: chopped fiber bundle [A]
109: first resin bath
110: first sheet roll
111: first carrier sheet
112: first resin sheet
113: sheet comprising chopped fiber bundles [A]
114: first conveyor
115: second sheet roll
116: second carrier sheet
117: second conveyor
118: second resin bath
119: second resin sheet
120: fiber-reinforced resin molding material precursor
121: pressurizing mechanism
122: fiber-reinforced resin molding material [C]
201: chopped fiber bundle [A]
301: rotational shaft of distributor
302: rod
401: reinforcing fiber bundle
402: iron plate for separation processing
403: contact part
404: projected part
405: entangled part
801: region in which measurement of bundle thickness is not performed
802: curved surface portion of molded product

DETAILED DESCRIPTION

Hereinafter, our materials, products and methods will be explained in detail together with examples.

Our fiber-reinforced resin molding material molded product is a molded product [D] comprising a fiber-reinforced resin molding material [C] prepared by impregnating chopped fiber bundles [A] obtained by cutting a reinforcing fiber bundle with a matrix resin [B], and is characterized in that in a region excluding 30 mm from an edge of the molded product [D], when an arbitrary rectangular region having an area of 40 mm² or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, the following requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;

[2] a ratio of the chopped fiber bundles [A] having a bundle thickness [E] of 200 μm or more is 5% or less; and

[3] a CV value of the bundle thickness [E] is 10-60%.

The chopped fiber bundles [A] are fiber bundles obtained by cutting a continuous reinforcing fiber bundle comprising a large number of filaments arranged in one direction at regular intervals in the fiber longitudinal direction.

As the chopped fiber bundles [A], for example, reinforcing fiber bundles are exemplified which use organic fibers such as aramid fibers, polyethylene fibers, and polyparaphenylene benzoxazole (PBO) fibers, inorganic fibers such as glass fibers, carbon fibers, silicon carbide fibers, alumina fibers, tyranno fibers, and basalt fibers, and ceramic fibers, metal fibers such as stainless steel fibers and steel fibers, and in addition, boron fibers, natural fibers, modified natural fibers and the like, as fibers. In particular, carbon fibers (particularly PAN-based carbon fibers) are light-weight among these reinforcing fibers, and have particularly excellent properties in terms of specific strength and specific elastic modulus, and are also excellent in heat resistance and chemical resistance, and therefore, are suitable.

As the matrix resin [B], a thermosetting resin or a thermoplastic resin can be used. As the resin, only the thermosetting resin may be used, only the thermoplastic resin may be used, or both the thermosetting resin and the thermoplastic resin may be used.

As the thermosetting resin, for example, exemplified are thermosetting resins such as an epoxy resin, an unsaturated polyester resin, a vinyl ester resin, a phenol resin, an epoxy acrylate resin, a phenoxy resin, an alkyd resin, a urethane resin, a maleimide resin, and a cyanate resin. In particular, an epoxy resin, an unsaturated polyester resin, or a vinyl ester resin is preferably used because it exhibits excellent interfacial adhesiveness to reinforcing fibers. As the thermosetting resin, one type may be used alone, or two or more types may be used in combination.

As the thermoplastic resin, for example, exemplified are polyolefin-based resins such as a polyethylene resin and a polypropylene resin, polyamide-based resins such as a polyamide 6 resin and a polyamide 6, 6 resin, polyester-based resins such as a polyethylene terephthalate resin and a polybutylene terephthalate resin, and a polyphenylene sulfide resin, a polyether ketone resin, a polyether sulfone resin, an aromatic polyamide resin and the like. As the thermoplastic resin, one type may be used alone, or two or more types may be used in combination.

Further, the matrix resin may be compounded with additives such as a curing agent, an internal mold release agent, a thickener, and a stabilizer, as needed.

The fiber-reinforced resin molding material [C] is obtained by impregnating chopped fiber bundles [A] with matrix resin [B]. In particular, one using a thermosetting resin as the matrix resin [B] is called as SMC (sheet molding compound) and can be used as an intermediate of the molded product [D].

The weight content of the chopped fiber bundles [A] of the fiber-reinforced resin molding material [C] is preferably 20% by weight or more and 75% by weight or less with respect to the total weight of the fiber-reinforced resin molding material [C], more preferably 30-70% by weight, and further preferably 40-70% by weight. If the weight content of the chopped fiber bundles [A] is the lower limit or higher, it is easy to obtain a molded product [D] of the fiber-reinforced resin molding material [C] having excellent mechanical properties. If the weight content of the chopped fiber bundles [A] is the upper limit or less, the flow resistance during molding is small, excellent flowability can be obtained, and the curvature and orientation unevenness of the chopped fiber bundles [A] can be reduced.

As the molded product [D], for example, exemplified are a product obtained by placing the fiber-reinforced resin molding material [C] in a mold and heating, and pressurization molding it using a press machine, or a product obtained by placing the fiber-reinforced resin molding material [C] in a mold after heating, and pressurization molding it using a press machine.

The bundle thickness [E] is a minor axis length of a cross section of the chopped fiber bundle [A] perpendicular to the fiber direction of the chopped fiber bundle [A], which exists in a cross section of the molded product [D] of the fiber-reinforced resin molding material [C] along the thickness direction of the molded product [D]. Further, the most frequent value of the bundle thickness [E] means the most frequent value in a section representing the highest value when a frequency distribution in which values of the bundle thickness [E] are distributed in sections set from 0 μm at intervals of every 10 μm is created. However, in the Examples and Comparative Examples described later, for convenience, when a frequency distribution in which values of the bundle thickness [E] were distributed in sections set from 0 μm at intervals of every 10 μm was created, it was determined as a central value of a section representing the highest value, for example, when the section of 30 to 40 μm was the corresponding section, the most frequent value was determined as 35 μm.

In the measurement of the bundle thickness [E] of the chopped fiber bundles [A], to perform an evaluation eliminating the influence on the bundle thickness due to the flow at the end of the molded product [D] at which the flow is disturbed during molding of the fiber-reinforced resin molding material [C], to consider the variation in measurement in the cross-section region excluding the region 30 mm from the end of the molded product [D], an arbitrary rectangular region having an area of 40 mm$^2$ or more and defined by a thickness of the molded product and a width perpendicular to the thickness direction of the molded product is set in a cross section in an arbitrary thickness direction, the measurement is carried out by measuring the bundle thicknesses [E] of all the reinforcing fiber bundles existing in the rectangular region. In addition, for example, with respect to regions of the molded product [D] where the flow is disturbed during molding of the fiber-reinforced resin molding material [C] such as welds and ribs to perform an evaluation eliminating the influence on the bundle thickness due to the flow, the regions are eliminated from the cross section for the measurement of the bundle thickness [E] of the reinforcing fiber bundle.

Figure 8:
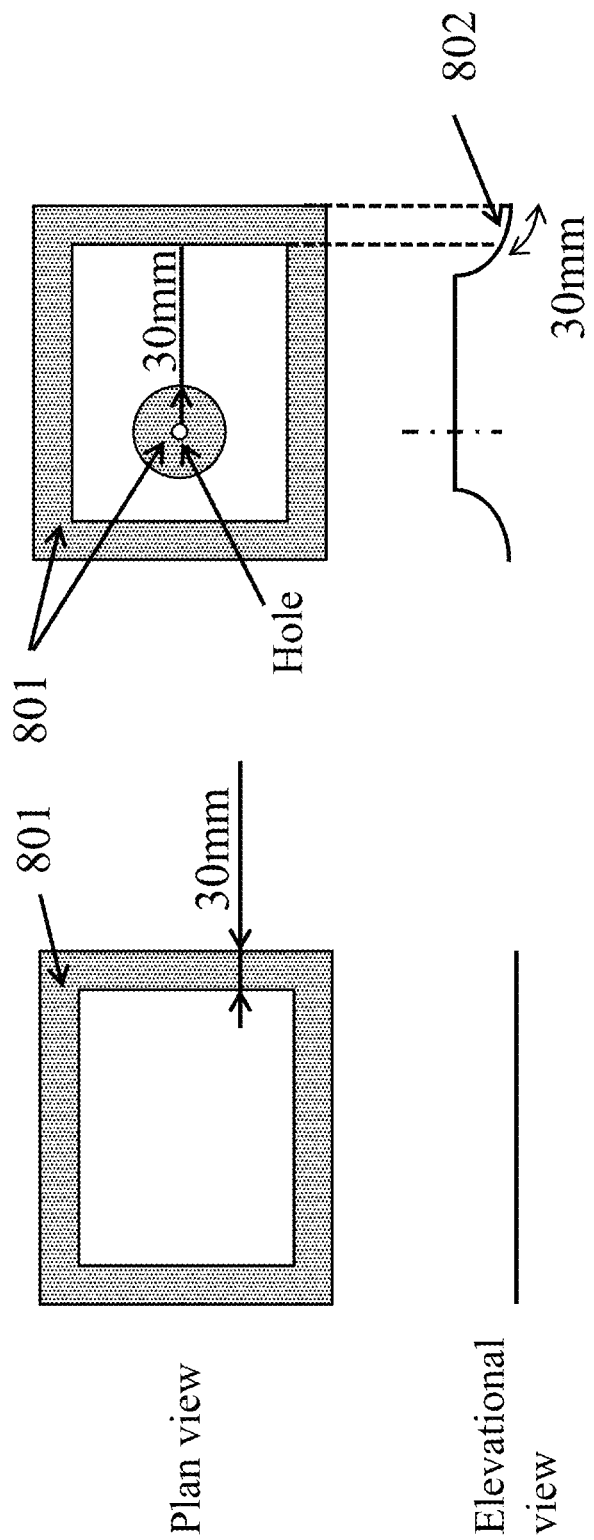
FIG. 8 is an explanatory diagram showing examples (example 1, example 2) of a region of 30 mm from an end of a molded product [D] in which bundle thickness measurement is not performed to eliminate the influence on the bundle thickness due to the flow during molding at the end of the molded product [D].

FIG. 8 depicts examples of a region 30 mm from the end of the molded product [D] in which the bundle thickness is not measured to eliminate the influence of the flow during molding at the end of the molded product [D] on the bundle thickness. In a flat plate shown as Example 1, a region of 30 mm from the end of a molded product is determined as a region 801 in which the measurement of the bundle thickness is not performed. In Example 2, a region of 30 mm from a hole of a molded product with a hole is also determined as a region 801 in which the measurement of the bundle thickness is not performed. Moreover, with respect to a curved surface portion 802 of the molded product, a region having a length of 30 mm of curved line from the end of the molded product is determined as a region 801 in which the measurement of the bundle thickness is not performed.

Destruction of the molded product [D] of the fiber-reinforced resin molding material [C] occurs from a starting point of a stress concentration portion at the end of the chopped fiber bundle [A]. Therefore, the strength of the molded product [D] can be improved by reducing the stress concentration at the end of the chopped fiber bundle [A]. As the method of reducing the stress concentration at the ends of chopped fiber bundles [A], a method of thinly controlling the bundle thickness [E] of chopped fiber bundles [A] is exemplified. From the above, it is important that the molded product [D] satisfies requirements [1] to [3] as described above:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;
[2] a ratio of the chopped fiber bundles [A] having a bundle thickness [E] of 200 μm or more is 5% or less; and
[3] a CV value of the bundle thickness [E] is 10-60%.

Regarding the above-described [1], if the most frequent value of the bundle thickness [E] corresponding to a target thickness of the bundle thickness [E] is set thinly, the stress concentration can be reduced and it is possible to achieve a high strength of the molded product [D] of the fiber-reinforced resin molding material [C]. However, if the most frequent value of the bundle thickness [E] is set thin, the process passability during the production of the fiber-reinforced resin molding material [C] is lowered. In view of the above, it is necessary that the most frequent value of bundle thickness [E] is 30 to 100 μm, it is preferred that the most frequent value of bundle thickness [E] is 30 to 90 μm, and it is more preferred that the most frequent value of bundle thickness [E] is 30-80 μm. In this example, the above-mentioned improvement effect is great, and a molded product [D] having excellent mechanical properties can be obtained.

Regarding the above-described [2], when there is a weak part in the molded product [D], destruction occurs from the weak part, and the strength of the molded product [D] will be determined by the strength of the weak part. Therefore, it is necessary to improve the mechanical properties to enhance the homogeneity of the molded product [D] to not cause a weak part in the molded product [D].

The bundle thickness [E] of the chopped fiber bundles [A] of the molded product [D] of the fiber-reinforced resin molding material [C] has a certain range distribution. In a bundle with a thick bundle thickness [E], the stress concentration at an end of the chopped fiber bundle [A] is great, and such a part becomes a weak part of the molded product [D]. Therefore, the strength of the molded product [D] of the fiber-reinforced resin molding material [C] changes depending upon the distribution of the bundle thickness [E], and even if the most frequent value of the bundle thickness [E] is the same, when many bundles with a large bundle thickness [E] are present in the molded product [D], the strength of the molded product [D] decreases. Therefore, it is necessary to reduce the ratio of chopped fiber bundles [A] with a large bundle thickness [E] to improve the strength of the molded product [D] of the fiber-reinforced resin molding material [C]. However, if the ratio of thick chopped fiber bundles [A] is reduced, the process passability during the production of the fiber-reinforced resin molding material [C] may be lowered. In view of the above, to improve the strength of the molded product [D], it is necessary that the ratio of chopped fiber bundles [A] having a bundle thickness [E] of 200 μm or more is 5% or less. Further, to avoid the reduction of the process passability, it is preferred that the ratio of chopped fiber bundles [A] having a bundle thickness [E] of 200 μm or more is 0.1-5%. More preferably, the ratio of chopped fiber bundles [A] having a bundle thickness [E] of 200 μm or more is 0.1-3%. In an example of such a ratio of chopped fiber bundles [A] having a bundle thickness [E] of 200 μm or more, the above-mentioned improvement effect is great, and a molded product [D] having excellent mechanical properties can be obtained.

Regarding the above-described [3], the bundle thickness [E] of the molded product [D] of the fiber-reinforced resin molding material [C] has a certain range distribution. Therefore, the strength of the molded product [D] of the fiber-reinforced resin molding material [C] changes depending upon the distribution of the bundle thickness [E], and even if the most frequent value of the bundle thickness [E] is the same, when the bundle thickness [E] is widely distributed, the strength of the molded product [D] of the fiber-reinforced resin molding material [C] varies. Therefore, it is necessary to narrow the distribution range of the bundle thickness [E] to reduce the variation of the strength of the molded product [D] of the fiber-reinforced resin molding material [C]. In view of the above, the coefficient of variation (CV) of the bundle thickness [E] needs to be 10-60%, the coefficient of variation (CV) of bundle thickness [E] is preferably 10-50%, and the coefficient of variation (CV) of bundle thickness [E] is more preferably 10-40%. In this example, the above-mentioned improvement effect is great, and a molded product [D] having an excellent homogeneity can be obtained.

Figure 6:
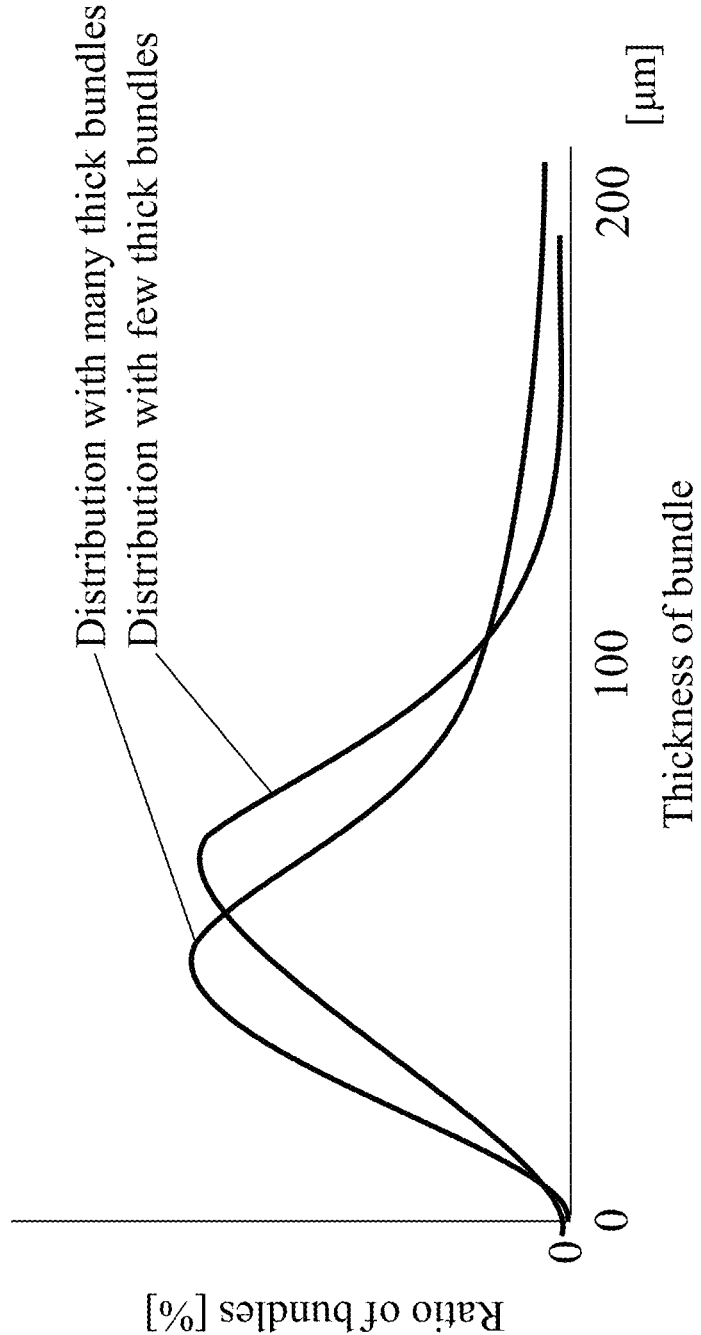
FIG. 6 is a relationship diagram between a bundle thickness and a bundle ratio used to explain the technical meaning of "a ratio of chopped fiber bundles [A] having a bundle thickness [E] of 200 μm or more."

The concept of the required properties as described above will be explained, for example, using FIGS. 6 and 7. As shown in FIG. 6 to explain the technical meaning of "the ratio of chopped fiber bundles [A] having a bundle thickness [E] of 200 μm or more," the distribution with many thick bundles and the distribution with few thick bundles become, for example, distributions as shown in the figure, and in both distributions, even if the average values of bundle thicknesses are the same, the distribution with few thick bundles becomes higher in strength. So far, there are many proposals that the average bundle thickness is 100 μm or less, but there is no proposal that clearly specifies the ratio of thick bundles. Namely, the bundle thickness contributes to the strength (the strength decreases as the bundle thickness increases), and even if the average value of the bundle thickness is the same, if there is a thick bundle, a destruction will occur from that portion as a starting point, and therefore, even if the average value is the same, the smaller the number of thick bundles is, the higher the strength is.

Figure 7:
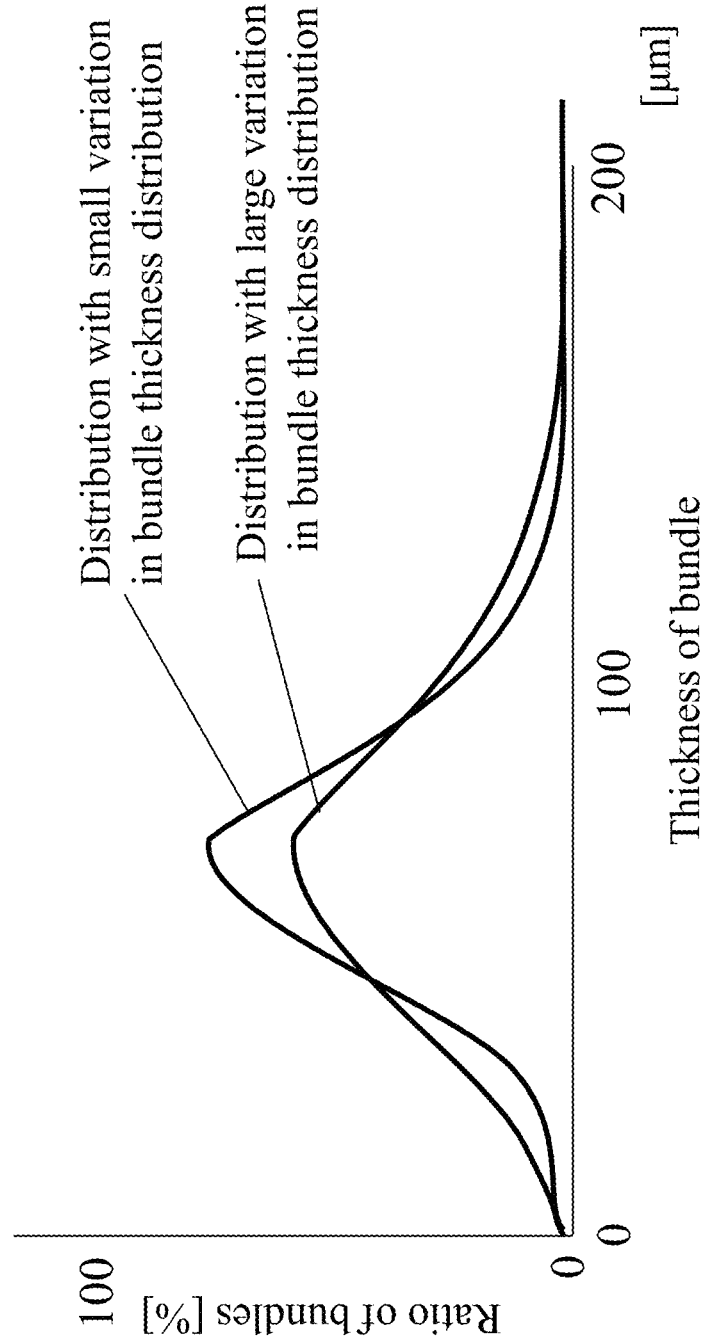
FIG. 7 is a relationship diagram between a bundle thickness and a bundle ratio used to explain the technical meaning of "CV value of bundle thickness [E]."

Further, as shown in FIG. 7 to explain the technical meaning of the "CV value of bundle thickness [E]," the distribution with a large variation in the bundle thickness distribution and the distribution with a small variation in the bundle thickness distribution become, for example, distributions as shown in the figure, and in both distributions, even if the average values of bundle thicknesses are the same, the CV value of strength is lower in the distribution with a smaller variation in the bundle thickness distribution. So far, there are many proposals that the average bundle thickness is 100 μm or less, but there is no proposal that specifies the CV value of the bundle thickness distribution. Namely, since the bundle thickness contributes to the strength (the strength decreases as the bundle thickness increases), it is possible to reduce the variation of strength by reducing the CV value of the bundle thickness distribution.

Further, in the fiber-reinforced resin molding material [C], the average value of the bundle thickness [E] is preferably 100 μm or less, and the average value of the bundle thickness

[E] is more preferably 80 μm or less. If the average value of the bundle thickness [E] is the above-described upper limit or less, the stress concentration at the end of the chopped fiber bundles [A] of the molded product [D] is reduced, and the strength of the molded product [D] of the fiber-reinforced resin molding material [C] can be improved. However, if the average bundle thickness is made too thin, the process passability during the production of the fiber-reinforced resin molding material [C] is lowered. In view of the above, the average value of the bundle thickness [E] is preferably 50 μm or more.

The method of producing a fiber-reinforced resin molding material molded product is a method of producing a molded product [D] comprising a fiber-reinforced resin molding material [C] prepared by impregnating chopped fiber bundles [A] obtained by cutting a reinforcing fiber bundle with a matrix resin [B], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;
[2] a ratio of the chopped fiber bundles [A] having a bundle thickness [E] of 200 μm or more is 5% or less; and
[3] a CV value of the bundle thickness [E] is 10-60%.

Regarding the above-described [2], as aforementioned, to improve the strength of the molded product [D], it is necessary that the ratio of chopped fiber bundles [A] having a bundle thickness [E] of 200 μm or more is 5% or less. Further, in consideration of avoiding lowering of process passability, it is preferred that the ratio of chopped fiber bundles [A] having a bundle thickness [E] of 200 μm or more is 0.1-5%. The ratio of chopped fiber bundles [A] having a bundle thickness [E] of 200 μm or more is more preferably 0.1-3%.

Although the fiber-reinforced resin molding material [C] is not particularly limited, it is manufactured using, for example, the apparatus shown in FIG. 1. In the apparatus shown in FIG. 1, the following scattering step and impregnation step are sequentially performed. Although the molded product [D] of the fiber-reinforced resin molding material [C] is not particularly limited, it is produced by, for example, the following molding steps.

Scattering Step

Figure 2:
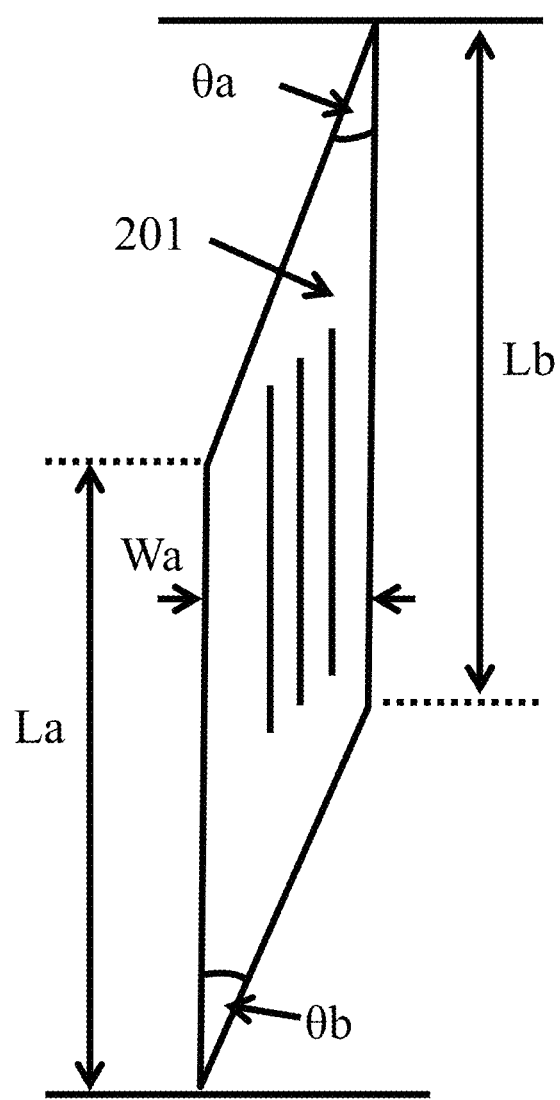
FIG. 2 is a two-dimensional plan projection view showing an example of a chopped fiber bundle [A], which shows places for measurement of fiber length, fiber bundle width and acute angles θa and θb of tip angles of the chopped fiber bundle [A].

In the scattering step, continuous reinforcing fiber bundles 103 supplied from bobbins 102 wound with the continuous reinforcing fiber bundles are drawn out, after being passed through nip rolls 104, continuously cut at a cutting machine 105 to have a predetermined length, the cut bundles are scattered on a first resin sheet 112. At the time of cutting, the continuous reinforcing fiber bundle may be cut at a predetermined angle such that the cutting angle θ is 0°<θ<90°. As shown in FIG. 2, the cutting angle indicates a smaller angle (acute angle) θa or θb among the angles formed between La or Lb and the cutting line of the chopped fiber bundle [A] 201. As the method of cutting the continuous reinforcing fiber bundle at a predetermined angle, exemplified is when an angle is given to the bundle when the bundle is conveyed to the cutting machine 105 and when an angle is given to the cutting machine 105 with respect to the bundle.

The cutting machine 105 is not particularly restricted so long as it does not obstruct the desired effect, and a guillotine blade type or a rotary cutter type can be exemplified. As described above, the direction of the blade for cutting is not particularly restricted with respect to the direction in which the reinforcing fiber strand is conveyed, and the blade may be angled in the same manner as the mechanism to convey the reinforcing fiber strand.

As a method of obtaining discontinuous reinforcing fiber bundles having different bundle lengths, a method of preparing a plurality of cutting machines 105 and obtaining discontinuous reinforcing fiber bundles having different bundle lengths can be exemplified.

As a result, a sheet 113 comprising chopped fiber bundles [A] in which chopped fiber bundles [A] 108 are randomly scattered via a distributor 106 is continuously formed on the traveling first resin sheet 112. At this time, a scattering regulation plate 107 may be provided to prevent the chopped fiber bundles [A] from being scattered to unnecessary places.

Impregnation Step

In the impregnation step, a first carrier sheet 111 is drawn out from a first sheet roll 110 and supplied to a first conveyor 114, and the paste of the matrix resin [B] is applied at a predetermined thickness by a doctor blade by a first resin bath 109 to form the first resin sheet 112.

A long second carrier sheet 116 is drawn out from a second sheet roll 115 and supplied to a second conveyor 117. The paste of the matrix resin [B] is applied to the surface of the second carrier sheet 116 at a predetermined thickness by a second resin bath 118 to form a second resin sheet 119.

The second resin sheet 119 is run by transporting the second carrier sheet 116, and the second resin sheet 119 is laminated and layered together with the second carrier sheet 116 onto the sheet 113 comprising the chopped fiber bundles [A]. As a result, a fiber-reinforced resin molding material precursor 120 in which the sheet 113 comprising the chopped fiber bundles [A] is sandwiched between the first resin sheet 112 and the second resin sheet 119 is continuously formed.

The fiber-reinforced resin molding material precursor 120 is pressed from both sides by a pressurizing mechanism 121, the matrix resin [B] of the first resin sheet 112 and the second resin sheet 119 is impregnated into the sheet 113 comprising the chopped fiber bundles [A], and a fiber-reinforced resin molding material [C] 122 is formed between the first carrier sheet 111 and the second carrier sheet 116.

Molding Step

Although the production process of the molded product [D] manufactured from the fiber-reinforced resin molding material [C] is not particularly limited, a generally used press molding method can be employed using the above-described fiber-reinforced resin molding material [C]. Namely, a mold separable into upper and lower parts having a shape of a target molded product is prepared, and the fiber-reinforced resin molding material [C] is placed in the cavity of the mold in a state that is smaller than the projection area of the cavity and thicker than the cavity thickness. At this time, the fiber-reinforced resin molding material [C] may be used alone, or a plurality of fiber-reinforced resin molding materials [C] may be used at a layered condition. Next, it is heated and pressed, the mold is opened, and the molded product is taken out for the production. The molding temperature, molding pressure, and molding time can be appropriately selected according to the shape of the target molded product.

In the method of producing the molded product [D] comprising the fiber-reinforced resin molding material [C] prepared by impregnating chopped fiber bundles [A] obtained by cutting a reinforcing fiber bundle with the matrix resin [B], by the condition where the chopped fiber bundles [A] are produced by widening the reinforcing fiber bundle, cutting the reinforcing fiber bundle, and then dispersing the chopped fiber bundles [A] by the distributor [G] 106, a molded product [D], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], a bundle thickness [E] of the chopped fiber bundles [A] present in the rectangular region satisfies requirements [1]-[3], can be easily obtained.

Figure 3:
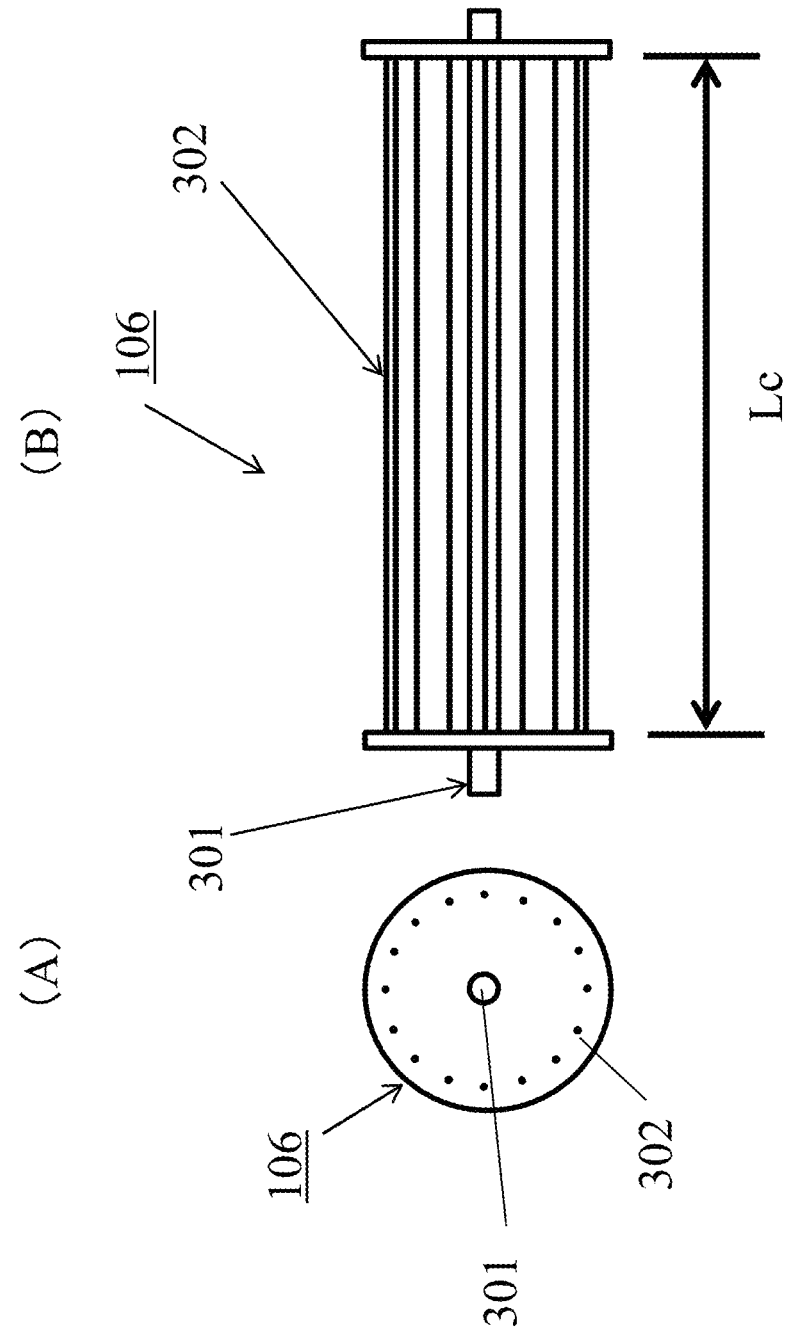
FIG. 3 is a side view (A) and an elevational view (B) showing an example of a structure of a distributor used in the production method.

As the distributor [G] 106 giving an impact to the chopped fiber bundles [A] after cutting to disperse them, for example, exemplified are one in which a plurality of rods are attached to a cylinder in the radial direction of the cylinder, one as illustrated in FIG. 3 as a distributor 106 having a cylindrical shape having side plates on both sides in the axial direction of a rotational shaft 301 and having a plurality of rods 302 installed between the side plates having a distance of Lc, one in which a plurality of rods are arranged in a mat conveying direction, further, one in which air is blown to disperse them and the like.

The material of the rod is not restricted as long as it can give an impact to the chopped fiber bundles [A] after cutting and, for example, a rod made of a material such as a metal or a plastic is considered. Further, also with respect to the shape of the rod, as long as it can give an impact to the chopped fiber bundles [A] after cutting, a round bar, a wire, a bar having a polygonal cross section or the like are exemplified regardless of the shape.

By dispersing using a distributor [G], except as effect that the variation in the areal weight of the fiber-reinforced resin molding material [C] is reduced and the homogeneity of the material is improved, an effect that the overlapping of the chopped fiber bundles [A] overlapped when the reinforcing fiber bundle is cut is eliminated and the bundle thickness [E] is thinned, and an effect of reducing the variation of the bundle thickness [E], are exhibited and, therefore, a molded product [D] having excellent mechanical properties, in which the bundle thickness [E] is within the range of requirements of [1] to [3], can be easily obtained.

Figure 4:
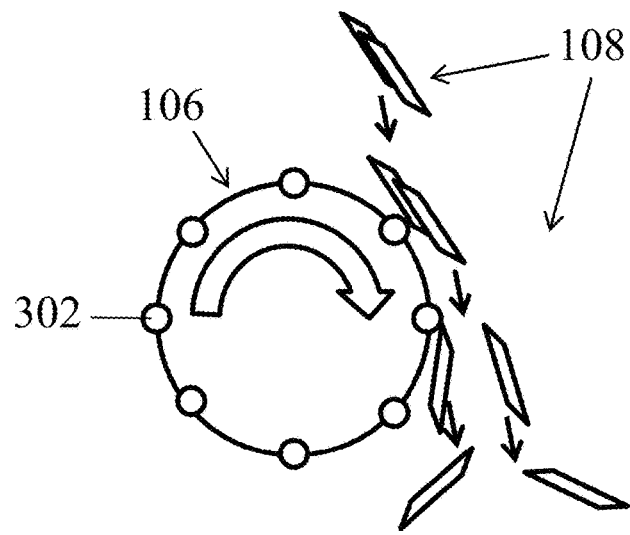
FIG. 4 is a schematic diagram showing an example of an operation of the distributor depicted in FIG. 3.

For example, as shown in FIG. 4, it becomes possible to hit the overlapping of chopped fiber bundles [A] 108, which tends to occur when cut into chopped fiber bundles [A], with a plurality of rods 302 of the rotated distributor [G] 106 and disperse them.

When the distributor [G] 106 hits the chopped fiber bundles [A] with the rods to disperse them as described above, if the speed of the rods hitting the chopped fiber bundles [A] is 0.1 to 8 m/sec, it becomes easy to obtain a molded product [D] having excellent mechanical properties in which the bundle thickness [E] is within the range of requirements of [1] to [3], and it becomes hard to cause a variation of the areal weight of the fiber-reinforced resin molding material [C] and an orientation of the chopped fiber bundles [A], due to the influence of an accompanying flow accompanying the movement of the distributor. The speed of the rods hitting the chopped fiber bundles [A] is more preferably 0.5 to 5 m/sec, and further preferably 1.5 to 5 m/sec.

Further, with respect to the widening of the width of the reinforcing fiber bundle before being cut, by setting the widening ratio to 300 to 1,200%, a molded product [D], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], a bundle thickness [E] of the chopped fiber bundles [A] present in the rectangular region satisfies the aforementioned requirements [1]-[3], can be easily obtained.

As a method of widening the reinforcing fiber bundle, for example, exemplified are a vibration widening method in which the reinforcing fiber bundle is passed through a vibrating roll and the fiber bundle is widened in the width direction by heating, rubbing, oscillating or the like by each opening bar, an air widening method in which compressed air is blown to the reinforcing fiber bundle or the like. With respect to the widened width of the reinforcing fiber bundle, by setting the widening ratio to 300 to 1,200%, the bundle thickness [E] of the chopped fiber bundles [A] can be reduced and the process passability can be maintained. Regarding the above-described widened width of the reinforcing fiber bundle, the widening ratio is more preferably 500 to 1,200%, further preferably 800 to 1,200%.

After the reinforcing fiber bundle is widened and after a partially separated fiber bundle [F], in which a partial separation processing in which cuts are provided intermittently along the fiber orientation direction of the reinforcing fiber bundle has been performed, is cut, by dispersing the chopped fiber bundles [A], while maintaining a high process passability, a molded product [D], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], a bundle thickness [E] of the chopped fiber bundles [A] present in the rectangular region satisfies requirements [1]-[3], can be easily obtained.

Figure 5:
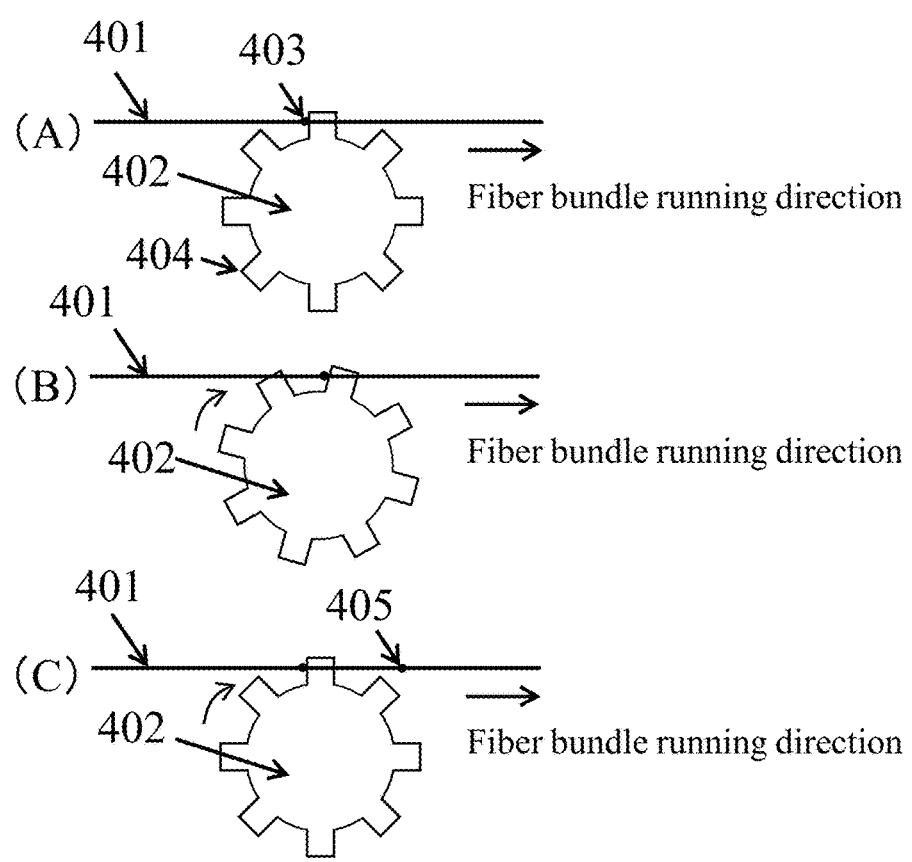
FIG. 5 is an explanatory diagram showing an example of a movement cycle in which a rotational separation means is inserted when partial separation processing is performed.

As the partial separation processing, for example, as shown in FIG. 5, exemplified are a method wherein, while a reinforcing fiber bundle 401 comprising a plurality of single fibers is traveled along the lengthwise direction (fiber bundle running direction), a rotary separation means (for example, an iron plate 402 for separation processing) provided with a plurality of projected parts 404 is penetrated into the fiber bundle 401 to create a separation-processed part, and an entangled part 405, where the single fibers are interlaced, is formed at a contact part 403 with the projected parts 404 in at least one separation-processed part (FIG. 5(A), (B)), thereafter the separation means is removed from the fiber bundle, and after passing through an entanglement accumulation part including the entangled part 405, the separation means is penetrated again into the fiber bundle 401 (FIG. 5(C)), and a method wherein a separation means provided with a plurality of projected parts is penetrated into a fiber bundle comprising a plurality of single fibers, while the separation means is traveled along the lengthwise direction of the fiber bundle, a separation-processed part is created, and an entangled part, where the single fibers are interlaced, is formed at a contact part with the projected part in at least one separation-processed part, thereafter the separation means is removed from the fiber bundle, and after the separation means is traveled up to a position passing through an entanglement accumulation part including the entangled part, the separation means is penetrated again into the fiber bundle.

As a partially separated fiber bundle [F], a reinforcing fiber bundle is exemplified wherein a separation-processed section in which a separation processing is performed in a reinforcing fiber bundle comprising a plurality of single fibers partially along the longitudinal direction of the reinforcing fiber bundle, and a not-separation-processed section formed between adjacent separation-processed sections, are formed alternately. In the production using the partially separated fiber bundle [F], since the number of fibers of the chopped fiber bundles [A] can be controlled, the mechanical properties can be improved, and the process can be passed while maintaining the convergence of fiber bundles, a high processability can be maintained.

EXAMPLES

Our materials, products and methods will be explained in more detail with reference to Examples.

After cutting and scattering the chopped fiber bundles [A], the fiber-reinforced resin molding material [C] was prepared by impregnating the matrix resin [B], and using the prepared fiber-reinforced resin molding material [C], a press molding was performed, and flexural properties were determined by the following evaluation method.

Used Raw Materials
Matrix resin [B]: A resin mixing 100 parts by weight of vinyl ester (VE) resin (supplied by Dow Chemical Co., Ltd., "Derakane 790" (registered trademark)), 1 part by weight of tert-butyl peroxybenzoate (supplied by Nippon Oil & Fats Co., Ltd., "Perbutyl Z" (registered trademark)), 2 parts by weight of zinc stearate (supplied by Sakai Chemical Industry Co., Ltd., SZ-2000), and 4 parts by weight of magnesium oxide (supplied by Kyowa Chemical Industry Co., Ltd., MgO #40), was used.

Evaluation Method of Bundle Thickness [E]

A fiber-reinforced resin molding material [C] was cut out to a piece of a size of 265×265 mm, and three pieces of it each aligned in the conveying direction (MD direction) of the fiber-reinforced resin molding material [C] in the fiber-reinforced resin molding material [C] production apparatus were stacked, and after placing them in the central part on a flat plate mold having a cavity of 300×300 mm (equivalent to 80% in terms of charge rate), they were cured by a heating type press molding machine at a condition of about 140° C.×5 minutes under a pressure of 13 MPa to obtain a flat-plate molded product [D] having (a size of length× width) of 300×300 mm×(a thickness) of 3 mm. Subsequently, the molded product [D] of the fiber-reinforced resin molding material [C] was cut along the thickness direction, the cut surface was polished to the extent that the single fibers forming the chopped fiber bundle [A] could be clearly recognized when observed with a digital microscope (product name: VHX-6000) at a magnification of 200 times, and with respect to the image taken as the microscope image, the bundle thickness [E] of the chopped fiber bundle [A] was measured at an accuracy of 0.001 mm. With respect to the measured bundle thickness [E] to derive the most frequent value, sections were set from 0 μm at intervals of every 10 μm, and it was determined as a central value of a section representing the highest value when a frequency distribution was created, for example, when the section of 30 to 40 μm was the corresponding section, the most frequent value was determined as 35 μm.

Evaluation Method of Flexural Properties

The flexural strength and flexural modulus were measured based on JIS-K7017 (1999). To measure the flexural strength and flexural modulus of an SMC molded plate, 6 test pieces were cut out from the SMC molded plate along each of the SMC conveying direction (0° direction) and width direction (90° direction) so that each test piece could have a size of a length of the test piece/a thickness of the test piece=50 and a width of the test piece=25 mm. Then, using a 5 kN Instron universal tester, each test piece was subjected to a 4-point bending test at conditions of a distance between fulcrums/a thickness of the test piece=40.5, a distance between fulcrums=3×distance between indenters, and a crosshead speed of 10 mm/min, and the flexural strength and the flexural modulus of each test piece were measured to determine the average value and the coefficient of variation (CV) of the test pieces. A summary of the evaluation results is shown in Table 1.

Evaluation Method of Tensile Properties

The tensile strength and tensile modulus were measured based on JIS-K7164 (2005). To measure the tensile strength and tensile modulus of the SMC molded plate, 6 test pieces, each having a length of 250 mm, a thickness of 3 mm and a width of 25 mm, were cut out from the SMC molded plate along each of the SMC conveying direction (0° direction) and width direction (90° direction). Then, using a 500 kN Instron universal tester, a tensile test was performed on each test piece at a crosshead speed of 2 mm/min, and the tensile strength and tensile modulus of each test piece were measured, and the average value and coefficient of variation (CV) of the test pieces were determined. A summary of the evaluation results is shown in Table 1. In the bending test, the maximum stress is applied to the surface of the material so it is influenced only by the defects on the surface of the material, but in the tensile test, the uniform stress is applied inside the material so it is influenced by all the defects in the material. Therefore, the influence of a decrease in strength due to the presence of defects can be recognized by the tensile test more easily.

Example 1

As the reinforcing fiber bundle, a continuous carbon fiber bundle having 50,000 filaments (supplied by ZOLTEK CORPORATION, product name: "ZOLTEK (registered trademark)" PX35-50K) was used. The reinforcing fiber bundle was unwound at a constant speed of 10 m/min using a winder, the unwound reinforcing fiber bundle was passed through a vibrating widening roll that vibrated in the axial direction at 5 Hz to widen the reinforcing fiber bundle, and then, by passing it through a width regulating roll regulated to a width of 50 mm, a widened reinforcing fiber bundle having a thickness of 0.03 mm (30 μm) widened to 50 mm was obtained. With respect to the obtained widened fiber bundle, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A first carrier sheet made of polypropylene was drawn out from the first raw material roll (first sheet roll) and supplied to the first conveyor, and the paste of the matrix resin [B] was applied thereto at a predetermined thickness using a doctor blade to form a first resin sheet.

The partially separated fiber bundle was supplied at an angle so that the cutting angle was about 15° when the bundle was conveyed to the cutting machine at a constant speed, and the fiber bundle was continuously cut obliquely. Next, the chopped fiber bundles [A] were distributed by a distributor, dropped and scattered onto the first resin sheet to continuously form sheet-like fiber bundles in which the fiber bundles were randomly oriented. The distributor was cylindrical, and a plurality of rods were provided on the side surface on a circumference with a radius of 10 cm centered on the rotation axis, and the distributor was installed to be located directly under the cutting machine and so that the rotation axis was perpendicular to the thickness direction of the sheet comprising the chopped fiber bundles [A] and perpendicular to the conveying direction of the sheet comprising the chopped fiber bundles [A], and the distributor was rotated at a clockwise direction with respect to the rotation axis of the distributor, as shown by the arrow in FIG. 1, when viewed from the right hand in the conveying direction with respect to the rotation direction of the distributor, at a speed of 400 rpm.

Next, a second carrier sheet made of polypropylene was drawn out from the second raw material roll (second sheet roll) and supplied to the second conveyor, and the paste of the matrix resin [B] was applied thereto at a predetermined thickness using a doctor blade to form a second resin sheet.

The second resin sheet was laminated and stacked together with the second carrier sheet onto the sheet comprising the chopped fiber bundles [A], and by pressurization from both surfaces, the matrix resin [B] was impregnated into the sheet comprising the chopped fiber bundles [A] to prepare a fiber-reinforced resin molding material [C]. Thereafter, the prepared fiber-reinforced resin molding material [C] was cured at a temperature of 25±5° C. for one week after production, and each evaluation was carried out.

The thickness of the fiber-reinforced resin molding material [C] was 2.1 mm when measured with a caliper. The areal weight of the obtained chopped fiber bundles [A] was 1,160 g/m$^2$, and the fiber weight content of the prepared fiber-reinforced resin molding material [C] was 57.2%.

Further, the fiber-reinforced resin molding material [C] was cut out to a size of 265×265 mm, the conveying direction (MD direction) of the fiber-reinforced resin molding material [C] in the fiber-reinforced resin molding material [C] production apparatus was aligned, three layers were stacked so that the outermost layer F1 of one fiber-reinforced resin molding material [C] was in contact with the surface F3 of another fiber-reinforced resin molding material [C] and stacked materials were placed on the central portion of a flat plate mold having a cavity of 300×300 mm (equivalent to 80% in terms of charge rate), and then, it was cured by a heating type press molding machine under a pressure of 10 MPa at a condition of about 140° C.×5 minutes to obtain a flat plate molded product [D] having a size of 300×300 mm×3 mm. The obtained molded product [D] was cut along the thickness direction, and all the bundle thicknesses [E] of the chopped fiber bundles [A], existing in the region having a width of 15 mm set in the cross-sectional region excluding a region of 30 mm from the edge of the molded product [D], were measured. The evaluation results are shown in Table 1. The flexural strength of this molded product was 381 MPa, the flexural modulus was 41 GPa, the tensile strength was 333 MPa, and the tensile modulus was 41 GPa. The evaluation results are shown in Table 1.

Example 2

As the reinforcing fiber bundle, a continuous carbon fiber bundle with 12,000 filaments (supplied by Toray Industries, Inc., product name: "TORAYCA (registered trademark)" T700SC-12000) was used. With respect to a carbon fiber bundle having a thickness of 0.02 mm, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A molded product was obtained in the same manner as in Example 1 except the method of manufacturing the partially separated fiber bundle as described above. The result of measuring the bundle thickness [E] performed in the same manner as in Example 1 is shown in Table 1. The flexural strength of this molded product was 434 MPa, the flexural modulus was 42 GPa, the tensile strength was 355 MPa, and the tensile modulus was 42 GPa. The evaluation results are shown in Table 1.

Example 3

As the reinforcing fiber bundle, a continuous carbon fiber bundle with 6,000 filaments (supplied by Toray Industries, Inc., product name: "TORAYCA (registered trademark)" T700SC-6000) was used. For a carbon fiber bundle having a thickness of 0.01 mm, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A molded product was obtained in the same manner as in Example 1 except the method of manufacturing the partially separated fiber bundle as described above. The result of measuring the bundle thickness [E] performed in the same manner as in Example 1 is shown in Table 1. The flexural strength of this molded product was 453 MPa, the flexural modulus was 43 GPa, the tensile strength was 360 MPa, and the tensile modulus was 42 GPa. The evaluation results are shown in Table 1.

Example 4

As the reinforcing fiber bundle, a continuous carbon fiber bundle having 50,000 filaments (supplied by ZOLTEK CORPORATION, product name: "ZOLTEK (registered trademark)" PX35-50K) was used. The reinforcing fiber bundle was unwound at a constant speed of 10 m/min using a winder, the unwound reinforcing fiber bundle was passed through a vibrating widening roll that vibrated in the axial direction at 5 Hz to widen the reinforcing fiber bundle, and then, by passing it through a width regulating roll regulated to a width of 75 mm, a widened reinforcing fiber bundle having a thickness of 0.02 mm (20 μm) widened to 75 mm was obtained. With respect to the obtained widened fiber bundle, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A molded product was obtained in the same manner as in Example 1 except the method of manufacturing the partially separated fiber bundle as described above. The result of measuring the bundle thickness [E] performed in the same manner as in Example 1 is shown in Table 1. The flexural strength of this molded product was 420 MPa, the flexural modulus was 41 GPa, the tensile strength was 345 MPa, and the tensile modulus was 42 GPa. The evaluation results are shown in Table 1.

Comparative Example 1

As the reinforcing fiber bundle, a continuous carbon fiber bundle having 50,000 filaments (supplied by ZOLTEK CORPORATION, product name: "ZOLTEK (registered trademark)" PX35-50K) was used. Subsequently, without widening the fiber bundle, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A molded product was obtained in the same manner as in Example 1 except the method of manufacturing the partially separated fiber bundle as described above. The result of measuring the bundle thickness [E] performed in the same manner as in Example 1 is shown in Table 1. The flexural strength of this molded product was 379 MPa, the flexural modulus was 42 GPa, the tensile strength was 300 MPa, and the tensile modulus was 41 GPa. The evaluation results are shown in Table 1.

Comparative Example 2

With respect to the partially separated fiber bundles prepared in the same manner as in Example 1, chopped fiber bundles were prepared in the same manner as in Example 1 except the production method in which the bundles were distributed and scattered without using a distributor, and a molded product was obtained in the same manner as in Example 1. The result of measuring the bundle thickness [E] performed in the same manner as in Example 1 is shown in Table 1. The flexural strength of this molded product was 375 MPa, the flexural modulus was 41 GPa, the tensile strength was 328 MPa, and the tensile modulus was 42 GPa. The evaluation results are shown in Table 1.

Comparative Example 3

As the reinforcing fiber bundle, a continuous carbon fiber bundle with 24,000 filaments (supplied by Toray Industries, Inc., product name: "TORAYCA (registered trademark)" T700SC-24000) was used. With respect to a carbon fiber bundle having a thickness of 0.10 mm, a separation processing means was prepared in which iron plates for separation processing each having a projected shape with a thickness of 0.3 mm, a width of 3 mm and a height of 20 mm were set in parallel at equal intervals of 5 mm with respect to the width direction of the reinforcing fiber bundle. As shown in FIG. 5, this separation processing means was intermittently inserted into and removed from the widened reinforcing fiber bundle to prepare a partially separated fiber bundle.

A molded product was obtained in the same manner as in Example 1 except the method of manufacturing the partially separated fiber bundle as described above. The result of measuring the bundle thickness [E] performed in the same manner as in Example 1 is shown in Table 1. The flexural strength of this molded product was 407 MPa, the flexural modulus was 43 GPa, the tensile strength was 328 MPa, and the tensile modulus was 42 GPa. The evaluation results are shown in Table 1.

TABLE 1

|  |  | Unit | Example 1 | Example 2 | Example 3 | Example 4 | Comparative Example 1 | Comparative Example 2 | Comparative Example 3 |
|---|---|---|---|---|---|---|---|---|---|
| Used raw material | Reinforcing fiber | — | PX35-50K | T700SC-12000 | T700SC-6000 | PX35-50K | PX35-50K | PX35-50K | T700SC-24000 |
|  | Matrix resin | — | [B] | [B] | [B] | [B] | [B] | [B] | [B] |
| Chopped fiber bundle | Most frequent value of bundle thickness [E] | mm | 65 | 45 | 35 | 45 | 55 | 65 | 45 |
|  | Ratio of chopped fiber bundles [A] having bundle thickness [E] of 200 μm or more | % | 1.2 | 1.3 | 0.2 | 0.0 | 5.2 | 6.4 | 6.9 |
|  | Coefficient of variation of bundle thickness [E] | % | 55.9 | 52.3 | 47.2 | 47.2 | 60.8 | 65.9 | 63.2 |
| Fiber-reinforced resin molding material | Fiber weight content | % | 57.2 | 60.0 | 60.4 | 59.6 | 58.7 | 58.7 | 62.9 |
| Molded product | Flexural strength | MPa | 381 | 434 | 453 | 420 | 379 | 375 | 407 |

TABLE 1-continued

|  | Unit | Example | | | | Comparative Example | | |
| --- | --- | --- | --- | --- | --- | --- | --- | --- |
|  |  | 1 | 2 | 3 | 4 | 1 | 2 | 3 |
| CV of flexural strength | % | 7.9 | 7.7 | 6.9 | 6.9 | 8.4 | 9.2 | 8.1 |
| Flexural modulus | GPa | 41.2 | 42.3 | 42.6 | 41.2 | 41.5 | 41.0 | 43.2 |
| CV of flexural modulus | % | 6.6 | 5.2 | 4.9 | 4.9 | 5.0 | 5.2 | 8.3 |
| Tensile strength | MPa | 333 | 355 | 360 | 345 | 300 | 280 | 328 |
| CV of tensile strength | % | 5.2 | 4.9 | 4.7 | 4.5 | 7.5 | 8.9 | 7.2 |
| Tensile modulus | GPa | 41.4 | 41.8 | 41.9 | 42.0 | 40.5 | 41.7 | 42.2 |
| CV of tensile modulus | % | 6.6 | 5.1 | 5.2 | 4.8 | 5.0 | 6.8 | 8.5 |

INDUSTRIAL APPLICABILITY

Our fiber-reinforced resin molding material molded product is used for automobile members such as doors and bumper reinforcements and seats (panels and frames), bicycle parts such as cranks and wheel rims, sports parts such as heads and rackets for golf, tennis and the like, traffic vehicle/aircraft parts such as interior materials, and industrial machine members such as robot arms, which are required with lightweight property and excellent mechanical properties. Among them, it can be preferably applied to automobile members such as doors, bumper reinforcements and seats (panels and frames), which are required to have molding followability in a complicated shape in addition to being lightweight.

The invention claimed is:

1. A fiber-reinforced resin molding material molded product which is a molded product [D] comprising a fiber-reinforced resin molding material [C] prepared by impregnating chopped fiber bundles [A] obtained by cutting a reinforcing fiber bundle with a matrix resin [B], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;
   [2] a ratio of a number of the chopped fiber bundles [A] having a bundle thickness [E] of 200 μm or more to a total number of the chopped fiber bundles [A] is 5% or less; and
   [3] a CV value of the bundle thickness [E] is in a range of 10-60%.

2. The molded product according to claim 1, wherein the ratio of a number of the chopped fiber bundles [A] having a bundle thickness [E] of 200 μm or more to a total number of the chopped fiber bundles [A] is 0.1-5%.

3. The molded product according to claim 1, wherein an average value of the bundle thickness [E] is 50 μm or more and 100 μm or less.

4. The molded product according to claim 1, wherein the reinforcing fiber bundle is a carbon fiber bundle.

5. The molded product according to claim 1, wherein the matrix resin [B] is a thermosetting resin selected from a vinyl ester resin, an epoxy resin or an unsaturated polyester resin.

6. A method of producing a fiber-reinforced resin molding material molded product which is a molded product [D] comprising a fiber-reinforced resin molding material [C] is prepared by impregnating chopped fiber bundles [A] obtained by cutting a reinforcing fiber bundle with a matrix resin [B], wherein in a region excluding 30 mm from an edge of the molded product [D], when an arbitrary rectangular region having an area of 40 mm$^2$ or more and defined by a thickness of the molded product and a width in a direction perpendicular to a thickness direction of the molded product is set in a cross section in an arbitrary thickness direction of the molded product [D], with respect to a bundle thickness [E] of the chopped fiber bundles [A] present in the set rectangular region, requirements [1]-[3] are satisfied:

[1] when a frequency distribution in which values of the bundle thickness [E] are distributed in sections set from 0 μm at intervals of every 10 μm is created, the most frequent value of the bundle thickness [E] in a section representing the highest value is 30-100 μm;
   [2] a ratio of a number of the chopped fiber bundles [A] having a bundle thickness [E] of 200 μm or more to a total number of the chopped fiber bundles [A] is 5% or less; and
   [3] a CV value of the bundle thickness [E] is 10-60%.

7. The method according to claim 6, wherein the ratio of a number of the chopped fiber bundles [A] having a bundle thickness [E] of 200 μm or more to a total number of the chopped fiber bundles [A] is 0.1-5%.

8. The method according to claim 6, wherein the chopped fiber bundles [A] are distributed by a distributor [G] after widening and cutting the reinforcing fiber bundle.

9. The method according to claim 8, wherein the distributor [G] distributes the chopped fiber bundles by hitting them with rods, and the speed of the rods hitting the chopped fiber bundles is 0.1-8 m/sec.

10. The method according to claim 8, wherein with respect to the widening of the reinforcing fiber bundle, the widening ratio is controlled at 300-1,200%.

11. The method according to claim 6, wherein the chopped fiber bundles [A] are distributed by a distributor [G] after widening the reinforcing fiber bundle and after cutting a partially separated fiber bundle [F] that has been subjected to partial separation processing for intermittently providing slits along a fiber orientation direction of the widened reinforcing fiber bundle.

* * * * *